(12) United States Patent
Yodyingyong

(10) Patent No.: US 11,124,419 B2
(45) Date of Patent: Sep. 21, 2021

(54) METHOD FOR PRODUCING A MICRON-SIZE SPHERICAL SILICA AEROGEL

(71) Applicant: Thilium Co., Ltd., Bangkok (TH)

(72) Inventor: Supan Yodyingyong, Nakhon Pathom (TH)

(73) Assignee: Thilium Co., Ltd., Bangkok (TH)

(*) Notice: Subject to any disclaimer, the term of this patent is extended or adjusted under 35 U.S.C. 154(b) by 240 days.

(21) Appl. No.: 16/342,130

(22) PCT Filed: Dec. 8, 2017

(86) PCT No.: PCT/TH2017/000086
§ 371 (c)(1),
(2) Date: Apr. 15, 2019

(87) PCT Pub. No.: WO2018/124979
PCT Pub. Date: Jul. 5, 2018

(65) Prior Publication Data
US 2019/0256363 A1 Aug. 22, 2019

Related U.S. Application Data

(60) Provisional application No. 62/441,218, filed on Dec. 31, 2016.

(51) Int. Cl.
*C01B 33/158* (2006.01)
*C01B 33/146* (2006.01)
(Continued)

(52) U.S. Cl.
CPC ........ *C01B 33/1585* (2013.01); *C01B 33/146* (2013.01); *C01B 33/152* (2013.01);
(Continued)

(58) Field of Classification Search
CPC . C01B 33/1585; C01B 33/146; C01B 33/152; C01B 33/159; C01P 2002/85;
(Continued)

(56) References Cited

U.S. PATENT DOCUMENTS

| | | | |
|---|---|---|---|
| 2013/0106008 A1* | 5/2013 | Ahn | C08K 7/10 264/5 |
| 2013/0189521 A1* | 7/2013 | Fukuju | C01B 33/16 428/402 |
| 2016/0280557 A1 | 9/2016 | Kim et al. | |

FOREIGN PATENT DOCUMENTS

| | | |
|---|---|---|
| CN | 101205067 A | 6/2008 |
| CN | 103964449 A * | 8/2014 |
| WO | 2017171279 A1 | 10/2017 |

OTHER PUBLICATIONS

International Search Report and Written Opinion of the ISA/US dated Sep. 18, 2018 in International Application No. PCT/TH2017/000086; 7pgs.

* cited by examiner

*Primary Examiner* — Sheng H Davis
*Assistant Examiner* — Michael Forrest
(74) *Attorney, Agent, or Firm* — Haukaas Fortius PLLC; Michael H. Haukaas

(57) ABSTRACT

A method for producing a micron-size spherical silica aerogel having a selectable or controllable average particle size, the method includes producing a surface-modified silica sol by adding a first organosilane compound to a aqueous acid-silica sol, which comprises an inorganic acid and a water glass solution, with a pH less than 3, dispersive mixing a non-polar organic solvent, a second organosilane compound, and the surface-modified silica sol, at a selected stilling rate which is inversely related to an average particle size, without adding any surfactant or dispersant, a micron- (Continued)

size spherical silica hydrogel and further a hydrophobic micron-size spherical silica gel are then produced. Following by drying or stirring the hydrophobic micron-size spherical silica gel to obtain a controllable micron-size silica aerogel in a spherical and powder forms, respectively.

20 Claims, 3 Drawing Sheets

(51) Int. Cl.
  *C01B 33/152* (2006.01)
  *C01B 33/159* (2006.01)
(52) U.S. Cl.
  CPC ........ *C01B 33/159* (2013.01); *C01P 2002/85* (2013.01); *C01P 2004/03* (2013.01); *C01P 2004/60* (2013.01); *C01P 2006/10* (2013.01); *C01P 2006/12* (2013.01); *C01P 2006/32* (2013.01)
(58) Field of Classification Search
  CPC .............. C01P 2004/03; C01P 2004/60; C01P 2006/10; C01P 2006/12; C01P 2006/32
  See application file for complete search history.

METHOD FOR PRODUCING A MICRON-SIZE SPHERICAL SILICA AEROGEL

RELATED APPLICATIONS

This application is a National Stage filing under 35 U.S.C. § 371 of International Application No. PCT/TH2017/000086 filed Dec. 8, 2017, which claims priority under 35 U.S.C. § 119(e) to U.S. Provisional Patent Application No. 62/441, 218, filed Dec. 31, 2016, which applications are incorporated herein by reference.

TECHNICAL FIELD

Aspects of the present disclosure relate to a method for producing a controllable micron-size or submicron-size spherical or nearly spherical silica aerogel using a waterglass solution.

BACKGROUND

Silica aerogel is a promising material that has many unique and fascinating properties, such as a very high porosity (>90%), high specific surface area (~800 $m^2/g$), low bulk density (0.05-0.20 $g/cm^3$), and low thermal conductivity (~0.02 $W/(m \cdot K)$).

Silica aerogels exhibit high porosity, an intrinsic nanopore structure, and low density, which make silica aerogels extremely valuable materials for a variety of applications including super-thermal insulation, acoustic insulation, catalysis or catalysis support, absorption, and sensing.

The preparation of silica aerogels conventionally requires a complicated, time-consuming, and energy-intensive process, beginning with gelation, followed by washing, ageing, surface modification, solvent substitution, and ending with supercritical drying. The complicated and time consuming nature of the process overall, and the energy intensiveness of the supercritical drying in particular, as well as the high cost of raw materials in certain conventional silica aerogel preparation processes, has severely restricted the widespread preparation and worldwide use of silica aerogels. With respect to mass production, supercritical drying is a high risk, high cost process, and very difficult to reliably translate from lab scale to commercial scale. Water glass (i.e., conventional soluble glass, or sodium silicate) is typically used as the starting material for purpose of cost reduction, but conventional processes that use water glass as a starting material are actually not very cost effective, because sodium ions present in the water glass must be removed either by way of a cation exchange process or washing the hydrogel with water.

Silica aerogel in powder or granulate form is prepared by crushing or pulverizing a hydrogel. However, when crushed or pulverized, the hydrogel breaks into non-uniformly sized particles, and hence the silica aerogel particle size in the powder or granulate cannot be readily or tightly controlled, leading to poor silica aerogel performance. In addition, in association with or following such crushing or pulverizing, the very small size of the majority of the aerogel particles makes them highly susceptible to environmental airflow disturbances, causing handling difficulty in practical use.

Published International Patent Application WO2008143384, published International Patent Application WO2009041752, U.S. Patent Publication US20100172815, and an article by Bhagat et al. (*Micropor. Mesopor. Mat.* 96, 237-244 (2006)) describe a process for manufacturing silica aerogel powder, including combining a water glass solution, which is not subjected to ion exchange, with an organosilane compound and an inorganic acid to subject the water glass solution to surface modification and gelation, thereby producing the hydrogel; followed by immersing the hydrogel in a nonpolar solvent to subject the hydrogel to solvent substitution and sodium ion removal, and subsequently drying the hydrogel at ambient pressure.

U.S. Pat. No. 8,961,919 and published European Patent Application EP2927194 disclose processes in which silica aerogel powder is prepared by using a water glass solution, an inorganic acid, an organisilane compound, and an organic solvent. The process includes dispersion-solution generation, gelation, solvent substitution, and drying. In the dispersion-solution generation, a dispersion solution is produced by dispersing the water glass solution and the organosilane compound in the organic solvent. In the gelation and solvent substitution, silica hydrogel is generated by adding the inorganic acid to the dispersion solution, simultaneous with gelation and solvent substitution. In the drying, silica aerogel powder is generated by drying the silica hydrogel at ambient or reduced pressure.

The processes disclosed in WO2008143384, WO2009041752, US20100172815, U.S. Pat. No. 8,961,919, EP2927194, and the article by Bhagat et al. involve chemical reactions that are unstable and difficult to manage, and cannot be used for preparing controllable micron-sized spherical silica aerogel, i.e., these processes are suitable only for producing silica aerogel powder having uncontrolled, poorly controlled, or insufficiently controlled particle sizes. More specifically, the disclosed chemical reactions have both (i) a direct reaction between a concentrated inorganic acid and an organosilane compound, and (ii) a direct reaction between a concentrated inorganic acid and a water glass solution happening at the same time during gelation. These simultaneous chemical reactions limit the choice of acid used, and also lead to difficulty in controlling the particle size and pore size of the aerogel, thus adversely affecting the properties of the aerogel. Additionally, these chemical reactions generate an undesirable amount of heat.

Spherical silica aerogels, i.e., silica aerogels in which the particles produced have regular spherical shapes instead of irregular shapes, are superior to silica aerogels in powder and granulate form with respect to particle size uniformity and distribution, purity, practicality, and handling. Unfortunately, the silica aerogel production processes described above are not suitable for producing spherical silica aerogels. More particularly, the aforementioned processes are unsuitable for producing spherical silica aerogel with an average particle size that is well-controlled and/or readily selectable, where the spherical particles have a well-controlled pore size.

For the production of spherical silica aerogels, spherical particles need to be produced during gelation. Therefore, the nature of the chemical reaction during gelation is key for controlling the shape, size, and properties of the spherical silica aerogel.

Several processes relating to the preparation of spherical silica aerogels have been proposed, such as disclosed in published Korean Patent Applications KR20120126741 and KR20150093063; published Chinese Patent Applications CN103787343, CN101200293, and CN1654324; United States Patent Publications US2013189521 and US2006084707; U.S. Pat. No. 3,872,271; published International Patent Application WO2012044052; and an article by Hong et al. (*J. Am. Ceram. Soc.* 94, 3198-3201 (2011)).

In these published works directed to the production of spherical silica aerogels, there are two techniques disclosed for preparing spherical silica hydrogels, namely, an emulsion technique and a droplet falling technique. In the former, spherical hydrogels are produced by dispersing water glass solution or silica sol in a non-polar organic solvent with a surfactant or dispersant for generating an emulsion. Then, the gelation of spherical hydrogels occurs while in emulsified state by adding a basic substance to the emulsion. For the latter, spherical hydrogels are produced by dropping or spraying silica sol into an oil, non-polar organic solvent, or alcohol to which a basic substance has previously been added. In both of these techniques, sodium ions are generally removed from the water glass before gelation using an ion exchange resin, or after gelation by washing with water. The spherical silica hydrogels are then transformed into hydrophobic spherical silica gels through surface modification and solvent substitution using an organosilane compound and non-polar organic solvent, respectively. Finally, hydrophobic silica aerogels are generated by drying the hydrophobic spherical silica gels at ambient pressure.

The known processes for preparing spherical silica aerogel using water glass are undesirably complicated and cost-ineffective. It is necessary to use cation exchange resin for the removal of sodium ions, and surfactant for generating an emulsion of silica sol and non-polar organic solvent. In addition, gel washing, ageing, solvent substitution, and surface modification are undesirably time consuming. Furthermore, most of the steps are separate, i.e., rather than concurrent.

Existing processes for producing spherical silica aerogels are demanding and not sufficiently cost effective, and thus have not yet been widely implemented in industry. A need exists for overcoming or solving at least some of the disadvantages associated with conventional spherical silica aerogel synthesis processes for the production of controllable micron-size spherical silica aerogels.

SUMMARY

This invention relates to a method for producing a micron-size spherical silica aerogel having a selectable or controllable average particle size, the method comprising the step of (a) providing an aqueous acid-silica sol comprising an inorganic acid and a water glass solution, with a pH less than 3; (b) producing a surface-modified silica sol by adding a first organosilane compound to the aqueous acid-silica sol, without gelation of the aqueous acid-silica sol; (c) dispersive mixing a non-polar organic solvent, a second organosilane compound, and the surface-modified silica sol until gelating to produce micron-size spherical silica hydrogels, without adding a surfactant or dispersant; (d) simultaneously performing ageing, further surface modification, and solvent substitution on the micron-size spherical silica hydrogels by allowing the micron-size spherical silica hydrogels produced in (c) to settle, wherein the solvent substitution is to extract water containing sodium ions from the micron-size spherical silica hydrogels; (e) removing the water containing sodium ions extracted from the micron-size spherical silica hydrogels for obtaining a hydrophobic micron-size spherical silica gel; and (f) drying the hydrophobic micron-size spherical silica gel produced in (e) to thereby produce the micron-size silica aerogels containing spherical particles, more specifically in step (c), the non-polar organic solvent is dispersedly mixed to the surface-modified silica sol at a selected stirring rate before further mixing to the second organosilane compound while stirring to produce the micron-size spherical silica hydrogels.

Another aspect of the invention relates to an average particle size of the micron-size silica aerogel which is inversely related to the selected stirring rate.

Another aspect of the invention relates to a micron-size spherical silica aerogel produced from the aforementioned method, wherein a median or average outer surface pore size that is 5-25 times smaller than a median or average interior pore size of the particles.

Further aspect of the invention relates to a method for producing a micron-size silica aerogel containing non-spherical particles by stirring the hydrophobic micron-size spherical silica gels in step (e). In addition, the method further produces a hydrophobic silica aerogel powder and an absorbent material.

BRIEF DESCRIPTION OF THE DRAWINGS

FIGS. 3B-3C show SEM images illustrating a difference between an average or median pore size on the outer surface of a representative micron-size spherical silica aerogel particle and an average or median pore size within the interior of this micron-size spherical silica aerogel particle.

DETAILED DESCRIPTION

Embodiments in accordance with the present disclosure are directed to processes for preparing, producing, or manufacturing spherical, approximately spherical, elliptical, and/or approximately elliptical micron-size and/or submicron-size silica gels. For purpose of brevity, in the present disclosure, the term spherical encompasses spherical, approximately spherical, elliptical, and approximately elliptical shapes, geometries, structures, or spatial configurations. Embodiments in accordance with the present disclosure are further directed to producing hydrophobic micron-size spherical silica aerogel and/or hydrophobic submicron-size spherical silica aerogel from the produced silica gels, with an average or median particle size that can be controllably or selectively established by way of adjustment or selection of particular process parameters, as further set forth below. In the description that follows, particular numerical values, such as but not limited to numerical values recited in association with the terms approximate or approximately, may be defined or taken to be within +/−20%, +/−15%, +/−10%, +/−5%, +/−2.5%, +/−1%, or +/−0% of the stated values unless otherwise indicated.

Figure 1:
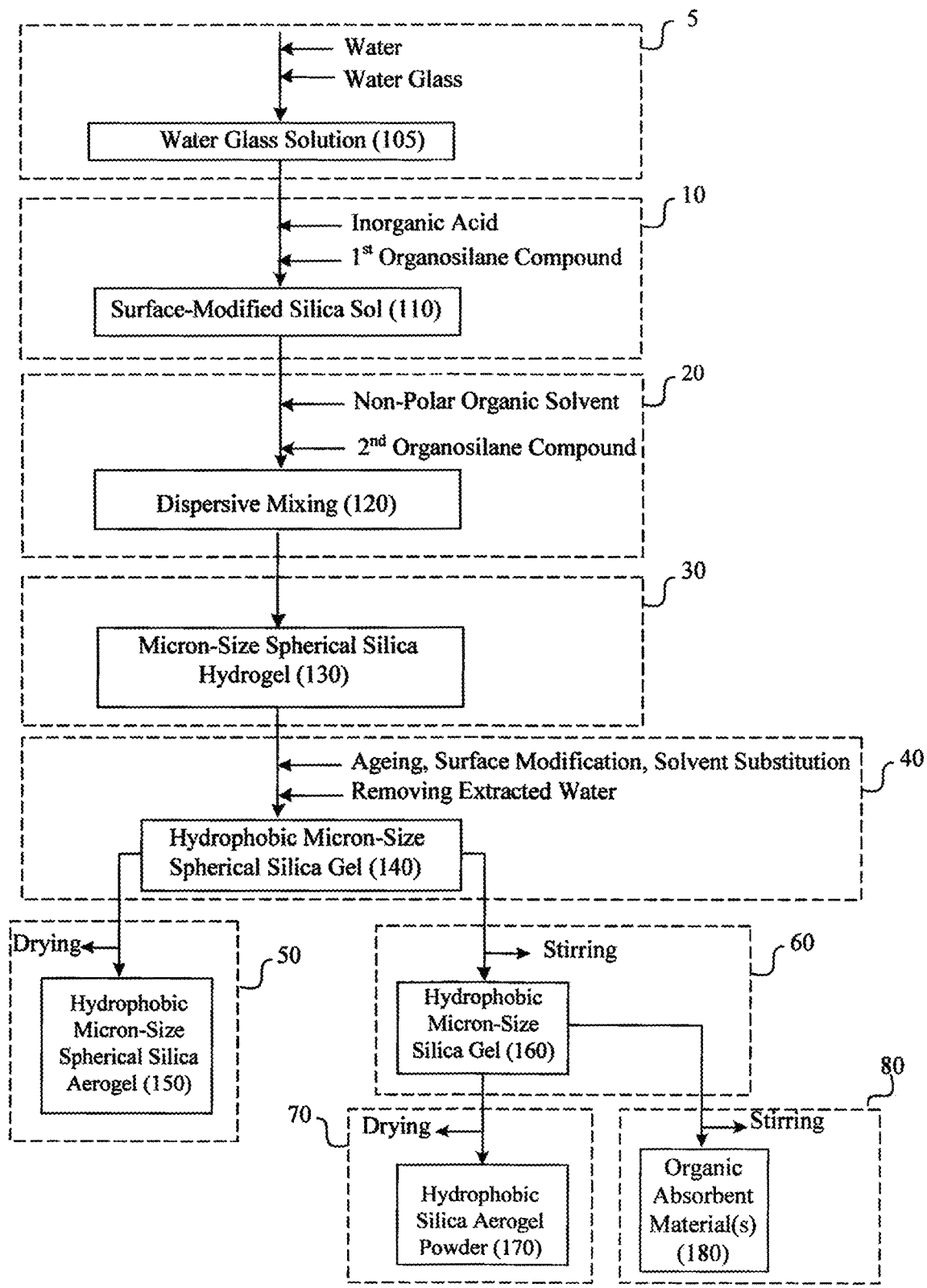
FIG. 1 is a flow diagram showing processes for producing a hydrophobic controllable spherical silica gel, such as a hydrophobic controllable micron-size spherical silica gel or a hydrophobic controllable submicron-size spherical silica gel, from which corresponding hydrophobic spherical silica aerogel can be produced, in accordance with representative embodiments of the present disclosure.

FIG. 1 is a flow diagram of a method for producing a micron-size spherical silica aerogel having a selectable or controllable average particle size, in accordance with a representative embodiment of the present disclosure. The steps in FIG. 1 can additionally or alternatively be used for preparing non-spherical hydrophobic silica aerogel powder and/or organic absorbent material(s), as further detailed below.

As shown in FIG. 1, a water glass solution (105) is prepared or provided 5 in a container or vessel. The water glass solution (105) typically has a silica content in the range of 3-15 wt %, and more particularly 5-12 wt %, and still more particularly 5-8 wt %, and can be readily prepared by diluting water glass (e.g., 30% wt % $SiO_2$) with tap water in a manner readily understood by individuals having ordinary skill in the art. Optionally, the water glass solution (105) can contain or the water glass can be provided or prepared in association with (e.g., in the presence of, or be carried by) a material such as a catalyst or opacifier, for instance, one or more of iron, nickel, platinum, rhenium, silver, vanadium oxide, titanium dioxide, and carbon black.

An aqueous surface-modified silica sol (110) is then prepared 10 by (i) introducing or adding an inorganic acid to the diluted water glass solution until the pH is less than 3 to produce an aqueous acid-silica sol; and (ii) adding a first organosilane compound to this acidic solution (i.e., the aqueous acid-silica sol having a pH<3), which results in silica particle surface modification. The inorganic acid can include or be one or more of sulfuric acid, nitric acid, and hydrochloric acid. The first organosilane compound can include or be hexamethyldisilazane (HMDS), trimethylchlorosilane (TMCS), or a combination thereof. During the preparation 10 of the aqueous surface modified silica sol (110), the pH is kept to less than 3, and the relative volume of the first organosilane compound to the aqueous acid-silica sol is controlled or kept to less than 6%, in order to prevent gelation.

Modifying the surface of the silica sol with the first organosilane compound (i.e., by way of adding the first organosilane compound into the aqueous acid-silica sol) increases the hydrophobicity of the silica sol, and facilitates the generation 20 of a dispersive mixing (120) without using or introducing any surfactant or dispersant (i.e., such dispersion can readily occur in the absence of an added surfactant or dispersant). Hence, no washing procedure or step is required for cleaning or removing a surfactant or dispersant in this method, and a surfactant or dispersant washing procedure can be avoided or eliminated.

Further, the dispersive mixing of a non-polar organic solvent, a second organosilane compound, and the surface-modified silica sol is to produce micron-size spherical silica hydrogels, without adding a surfactant or dispersant. More specifically, the nonpolar organic solvent is dispersedly mixed to the surface-modified silica sol (110) while stirring at a selected stirring rate, (i.e. preferably at 600-1,500 rpm) following exposure of the silica sol to the first organosilane compound before further mixing with the second organosilane compound to produce micron-size spherical silica hydrogels. Another way for the dispersive mixing is to prepare a mixture of a non-polar organic solvent and a second organosilane compound and subsequently add the surface-modified silica sol (110) in association with or followed by stirring, without causing gelation of the entire vessel contents, thereby producing or generating micron-size spherical silica hydrogels (130). However, for this alternative, the condition of pH and a selected stirring rate is subjected to some specific controls, (i.e. preferably pH<1).

At the low pH between 0-1, neither silica precipitation nor gelation of the aqueous surface-modified silica sol occurs during the formation of the aqueous surface-modified silica sol. However, during or after the addition of the mixture of the non-polar organic solvent and the second organosilane compound to the aqueous surface-modified silica sol, in association with or followed by stirring, the pH of the solution slowly increases. The aqueous surface-modified silica sol does not undergo gelation at the onset of stirring, but as the pH increases over time due to the addition of the mixture of the non-polar organic solvent and the second organosilane compound to the aqueous surface-modified silica sol or the presence this mixture therein, with stirring, gelation occurs and the micron size spherical silica hydrogels (130) are formed, which is an unexpected and surprising result.

At the less acidic condition, (i.e. 1<pH<3), the gelation may be promptly generated, in minutes or even within few seconds, so the way of stirring the nonpolar organic solvent with the surface-modified silica sol before further mixing to the second organosilane compound may be more suitable than that of mixing a nonpolar organic solvent and a second organosilane compound before adding to the surface-modified silica sol (110).

The volume ratio of the surface-modified silica sol (110) to the non-polar organic solvent for generating the dispersion (120) is typically in the range of 1:1-1:2. If the volume ratio of the nonpolar organic solvent to the surface-modified silica sol (110) is greater than 2, the time required for completion of the silica sol surface modification reaction is undesirably or excessively long (e.g., more than 3 hours), making it less feasible or more difficult to complete the surface modification in a short, reasonable, or commercially suitable or viable period of time. The non-polar organic solvent can include or be pentane, hexane, cyclohexane, methylcyclohexane, heptane, toluene, xylene, or a combination or two or more thereof, while the second organosilane compound can be HMDS, hexamethyldisiloxane (HMDSO), TMCS, or a mixture of two or more thereof. The volume of the second organosilane compound is greater than 4% of the surface-modified silica sol (110).

After the second organosilane compound has been added to the non-polar organic solvent, it can be seen visually distinguishable layers of polar and non-polar mixtures. Therefore, it is essential to enable the dispersive mixing by stirring the mixtures at any selected rate or speed to avoid the separation into distinct or distinguishable layers. The higher the stirring speed, the smaller the size (i.e., the average or median particle size) of the spherical silica particles in the gel (130). As a result, there is an inverse relationship between the size of the spherical silica particles in the gel (130), and hence the size of the spherical silica particles in the subsequently produced aerogel (150), and the selected stirring speed. Consequently, the size of the spherical silica particles in a subsequently formed silica aerogel (150) is readily controllable or controlled by way of selection or adjustment of this stirring speed. To obtain a smaller size, a selected stirring rate or speed may be increased by means of a higher stirring rate (relatively to a selected stirring rate), adding sonication to a selected stirring rate, or a combination thereof. For example, the formation or preparation of smaller, significant smaller, or much smaller than average or median silica particle size formed by stirring alone may be performed by adding the sonication emitting ultrasound energy at or above a frequency of 20 kHz for a period of 10-30 minutes. Consequently, the size of the spherical silica particles in a subsequently formed silica aerogel (150) is controllable or controlled by way of selection or adjustment of this stirring speed.

Following the formation of the micron-size spherical silica hydrogels (130), stirring stops and then the hydrogels are settled at the bottom of the vessel.

Next, ageing, further surface modification (i.e., surface modification of the micron-size spherical silica hydrogels (130) by the second organosilane compound, which further surface-modifies the silica particles beyond the initial surface modification thereof in the silica sol (110) by the first organosilane compound), and solvent substitution 40 simultaneously proceed in a temperature range of 25-80° C. Increasing the hydrophobicity of the silica sol (110) by way of surface modification with the first organosilane compound accelerates both the further surface modification with the second organosilane compound and the solvent substitution while ageing.

The ageing, further surface modification, and solvent substitution 40 complete within a matter of hours, e.g., approximately 2 hours. During the ageing, further surface modification, and solvent substitution 40, the further surface modification increases the hydrophobicity of the micron-size spherical silica hydrogels (130). Additionally, the chemical processes that occur during the simultaneous ageing, further surface modification, and solvent substitution 40 result in the extraction of water from the micron-size silica hydrogels (130). Thus, the simultaneous ageing, further surface modification, and solvent substitution 40 chemically extract water from the micron-size silica hydrogels (130).

After the further surface modification of the micron-size spherical silica hydrogels (130) is complete, hydrophobic micron-size spherical silica hydrogels (140) float on the surface of the water in the vessel (i.e., a lower portion of the vessel contains the water that was extracted from the micron-size spherical silica hydrogels (130) by way of the simultaneous ageing, further surface modification, and solvent substitution 40, and an adjacent portion of the vessel above this lower portion of the vessel contains the hydrophobic micron-size spherical silica gels (140) floating on the surface of this extracted water.

This method causes sodium ions to be eliminated from the hydrogel networks along with the water contained in the hydrogel networks by way of the solvent substitution, which is induced by the hydrophobicity of the silica surface during the further surface modification by the second organosilane compound. Consequently, after the simultaneous ageing, further surface modification, and solvent substitution 40, the water that was extracted from the micron-size silica hydrogels (130) contains sodium ions. The process thus avoids or eliminates a separate cation exchange procedure for sodium ion removal.

The water that was extracted from the micron-size silica hydrogels (130) during the simultaneous ageing, further surface modification, and solvent substitution 40 is next removed or withdrawn from the vessel, i.e., the extracted water below the hydrophobic micron-size spherical silica gels (140) is removed or transferred away from the vessel (e.g., by drainage of the extracted water from the bottom of the vessel), to obtain a hydrophobic micron-sized spherical silica gel (140).

The steps of the gelation, ageing, further surface modification, and solvent substitution 40 occur or are performed together, simultaneously, or concurrently, rather than sequentially. The total time from the start to the completion of the hydrophobicization (at which point the hydrophobic micron-size spherical silica gels (140) float on the surface of the water extracted therefrom) is less than 2 hours. The process thus exhibits significantly increased time efficiency compared to prior processes. At this point, the hydrophobic micron-size spherical silica aerogels containing spherical particles (150) can be produced or formed 50 by way of drying the hydrophobic micron-size spherical silica gels.

To produce 50 the hydrophobic micron-size spherical silica aerogels (150), the drying can occur at 100° C. for 1 hour under ambient pressure, followed by drying at 150-200° C. for 30 minutes to 1 hour under reduced or negative pressure or vacuum conditions. The controllable micron-size spherical silica aerogels prepared by way of this process (50) in accordance with the present disclosure can have essentially entirely or predominantly spherical characteristics. More particularly, the controllable micron-size spherical silica aerogels can be spherical, essentially or nearly spherical, or broken spherical aerogel, e.g., with particle sizes ranging from approximately 5-1,500 microns, density of 0.05-0.2 g/cm$^3$, specific surface area of approximately 800 m$^2$/g, and thermal conductivity of approximately 0.02 W/(m·K).

To produce 60 the hydrophobic micron-size silica gels (160) having essentially entirely, mostly, or predominantly non-spherical silica particles or a significant fraction of non-spherical silica particles therein, the hydrophobic micron-size spherical silica gels (160) are continuously stirred in order to generate non-spherical silica particles.

That is, stirring can be applied at a speed and duration sufficient to destroy the spherical shape of some or essentially all of the silica particles in the hydrophobic micron-sized spherical silica gels (140) to non-spherical or a fraction of non-spherical or powder forms. For instance, such stirring rate can occur at speed of 1,500 rpm for 30 minutes. The production 70 of hydrophobic silica aerogel powder (170) can then occur by way of drying the hydrophobic micron-size silica gels (160), such as in a manner analogous to the drying described above.

Alternatively, the hydrophobic micron-size spherical silica gels containing non-spherical particles are capable of coating to a porous material to form an organic absorbent material. One or more types of organic absorbent materials (180) can be produced 80 by coating (e.g., dip coating, or spray coating) one or more types of target porous materials with the hydrophobic micron-size silica gels (160), and then drying such coated materials in a manner readily understood by individuals having ordinary skill in the art.

A Representative Example for Producing a Micron-Size Spherical Silica Aerogel

A 30 wt % water glass solution is provided in a vessel, then a tap water is added to form a 5 wt % of a water glass solution. While the diluted water glass is being stirred at 1,000 rpm, a sulfuric acid is added to the solution until the pH of the solution (silica sol) is approximately 2. While the silica sol is being stirred at 1,000 rpm, the HMDS is added at a volume of 2% relative to the silica sol, to modify the surface of the silica sol (i.e., for surface modification of the silica particles within the silica sol). The surface-modified silica sol is then dispersed in a n-hexane. The n-hexane is added at a volume of 150% relative to the silica sol. While the dispersive mixing is being stirred at 1,000 rpm, the HMDS is added at a volume of 8% relative to the surface-modified silica sol, which results in the formation of micron-size spherical silica hydrogels. Gelation proceeds in the manner set forth above, resulting in the formation of a hydrogel; and ageing, ongoing/further surface modification, and solvent substitution simultaneously proceed at 55° C. and complete within 2 hours, producing hydrophobic micron-size spherical gels. Water (containing sodium ions) that was extracted from these hydrogels as a result of the solvent substitution is then removed from the vessel, after which the hydrophobic micron-size spherical silica gels are dried at 100° C. for 1 hour, followed by further drying at 150° C. for 1 hour, yielding the micron-size spherical silica aerogels with the spherical size ranging from 100-200 microns, density of ~0.09 g/cm$^3$, specific surface area of ~800 m$^2$/g, and thermal conductivity of approximately 0.02 W/(m·K). Further, to produce a smaller size or less than 100-200 microns, the higher stirring speed (i.e. 1,200 rpm), is introduced to a dispersive mixing (120). The micron-size spherical silica aerogels with the spherical size ranging from 50-80 microns are then finally obtained.

Figure 2:
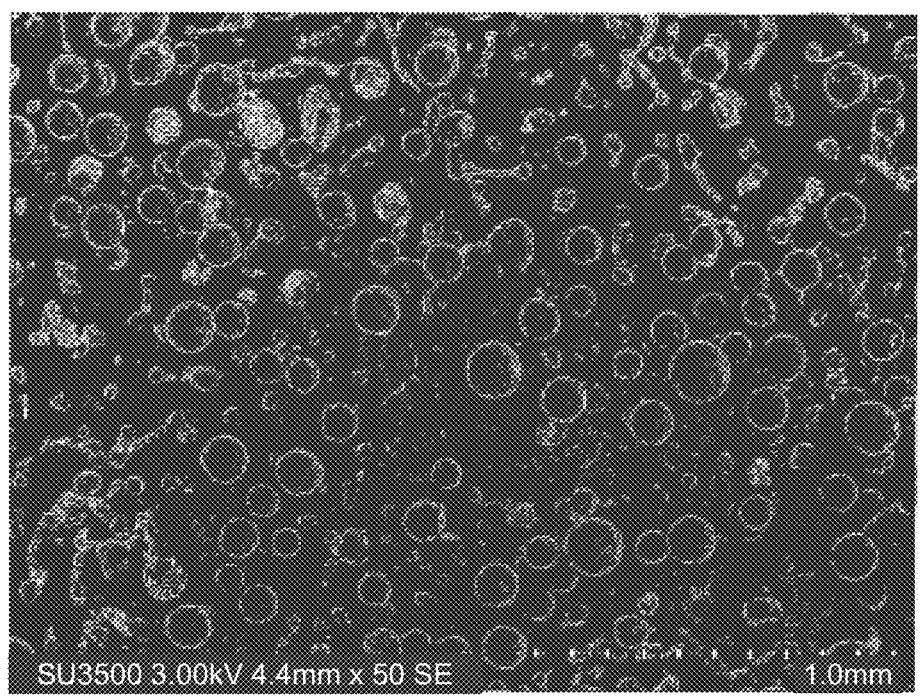
FIG. 2 is a scanning electron microscope (SEM) image illustrating a representative micron-size spherical silica aerogel.
Figure 3A:
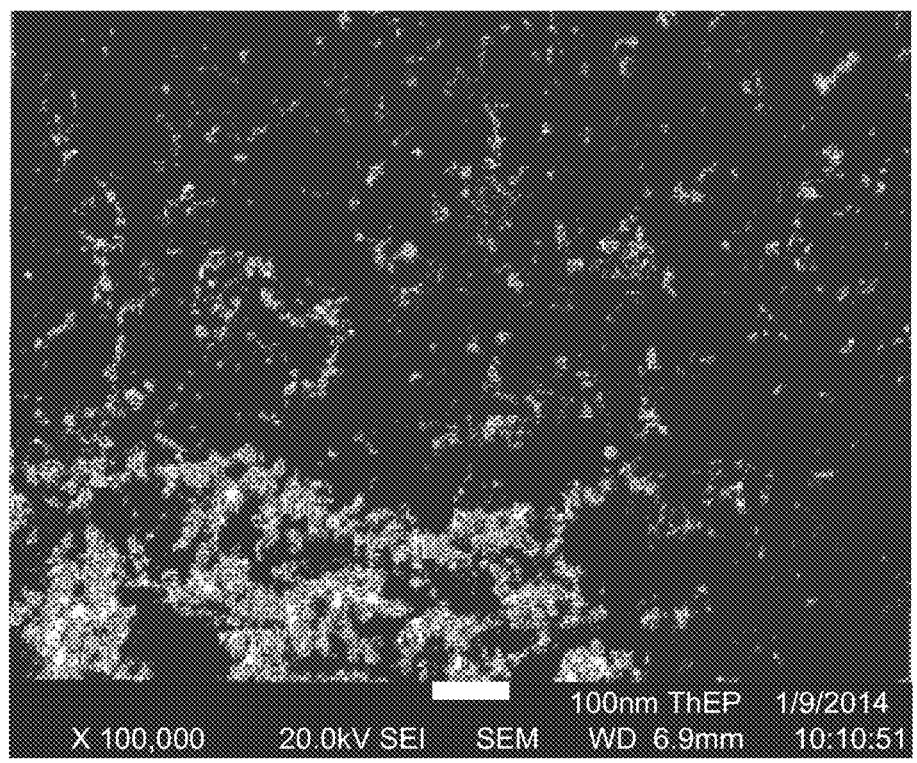
FIG. 3A is a field-emission scanning electron microscope (FE-SEM) image showing nano-porous structures in the representative spherical silica aerogel.

In order to evaluate the nature, characteristics, or properties of the spherical shape and nanostructures of the micron-size spherical silica aerogels prepared in this Example, the micron-size spherical silica aerogels were observed through an electron microscope. FIG. 2 is a scanning electron micrograph (SEM) image illustrating the spherical shape of the micron-size spherical silica aerogels, which clearly shows that the produced aerogel had spherically-shaped particles with size in the micron range. FIG. 3A is a field-emission scanning electron microscope (FE-SEM) image illustrating the particle size and nano-porous structures of the micron-size spherical silica aerogels prepared in this Example. It can be seen that the micron-size spherical silica aerogels had a three-dimensional nano-porous structure consisting of primary particles having diameters of less than 10 nanometers. The aerogel exhibited good interconnectivity between silica particles with small pores (mesoporous) in the overall aerogel structure.

In various embodiments, the median or average pore size on the outer or exterior of a micron-size spherical silica aerogel particle is significantly smaller than the median or average pore size within the interior of the particle, for instance, by at least a factor of 5-25. FIGS. 3B-3C show SEM images indicating a difference between a median or average pore size on the outer surface of a representative micron-size spherical silica aerogel particle and a median or average pore size within the interior of the representative micron-size spherical silica aerogel particle. With respect to the representative micron-size spherical silica aerogel particle shown in FIG. 3B-3C, the median or average pore size on the outer or exterior surface of this spherical silica aerogel particle is approximately 2.5 nm, and the median or average pore size within the interior of this spherical silica aerogel particle is approximately 24 nm.

Figure 4:
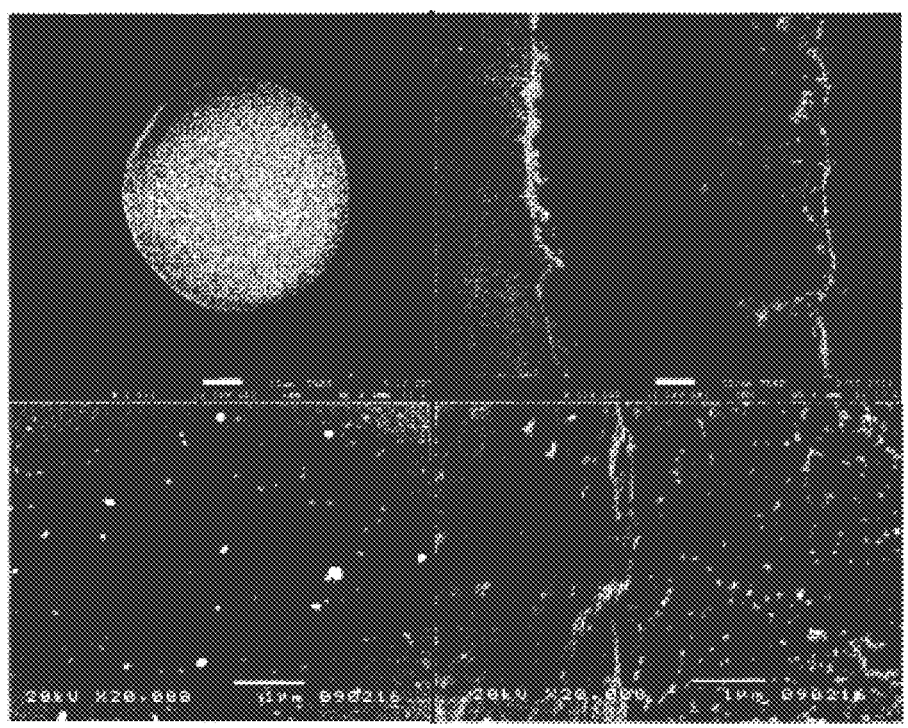
FIG. 4 is a graph illustrating results of energy dispersive X-ray spectroscopy (EDX) characterization of the representative spherical silica aerogel.
Figure 4:
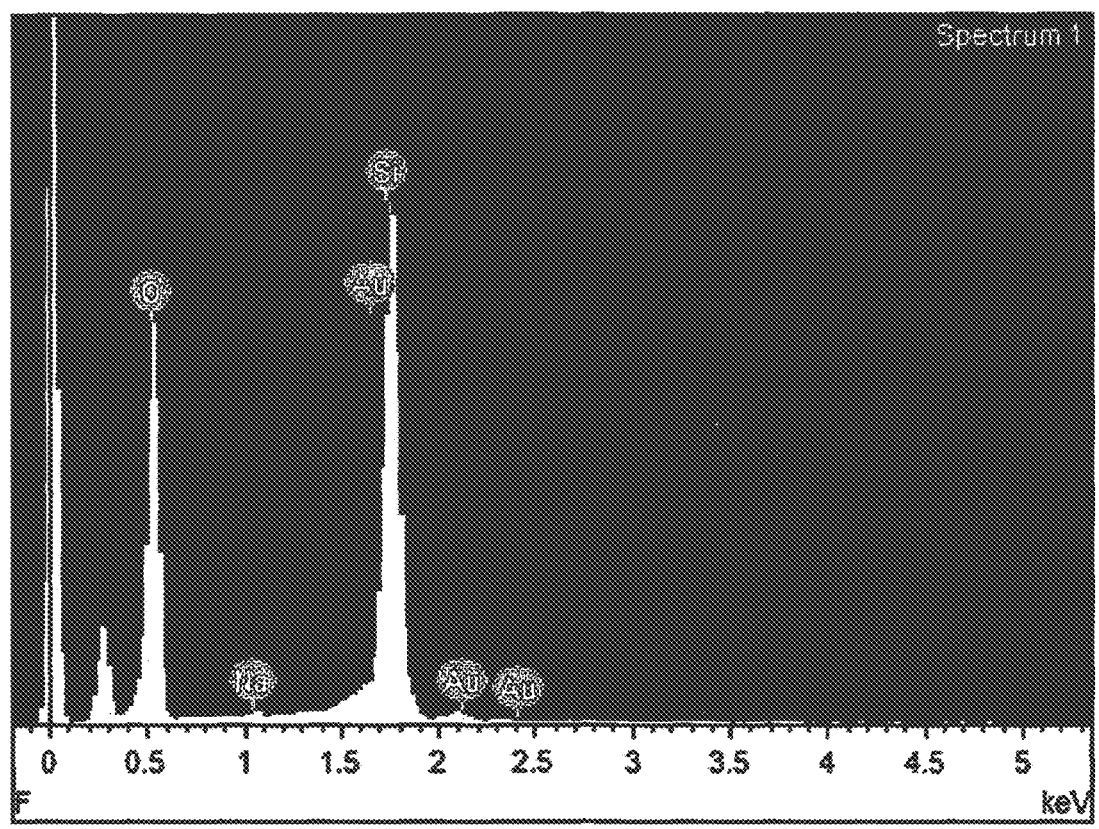

The chemical components that remained in the as-produced micron-size spherical silica aerogels were analyzed using energy-dispersive X-ray spectroscopy (EDX). FIG. 4 is a graph illustrating the EDX analysis results, from which it is evident that almost no sodium component remained in the micron-size spherical silica aerogels.

Embodiments in accordance with the present disclosure have applications in various technological fields, including (but not limited to) thermal insulation, thermal energy storage, encapsulation of phase change material(s), catalysis, drug delivery, environmental applications, and other fields.

Aspects of particular embodiments of the present disclosure address at least one aspect, problem, limitation, and/or disadvantage associated with conventional manners of preparing hydrophobic micron-size spherical silica gels and aerogels. While features, aspects, and/or advantages associated with certain embodiments have been described in this disclosure, other embodiments may also exhibit such features, aspects, and/or advantages, and not all embodiments need necessarily exhibit such features, aspects, and/or advantages to fall within the scope of the present disclosure.

It will be appreciated by a person of ordinary skill in the art that particular aspects of the above-disclosed process can be combined into other different systems, devices, components, processes, and/or applications. In addition, by a person having ordinary skill in the art can make various modifications, alterations, and/or improvements to one or more embodiments disclosed herein, where such modifications, alterations, and/or improvements remain within the scope of the present disclosure and the claims set forth below.

I claim:

1. A method for producing a micron-size spherical silica aerogel having a selectable or controllable average particle size, the method comprising:
    (a) providing an aqueous acid-silica sol comprising an inorganic acid and a water glass solution, with a pH less than 3;
    (b) producing a surface-modified silica sol by adding a first organosilane compound to the aqueous acid-silica sol, without gelation of the aqueous acid-silica sol;
    (c) dispersive mixing a non-polar organic solvent, a second organosilane compound, and the surface-modified silica sol until gelating to produce micron-size spherical silica hydrogels, without adding a surfactant or dispersant;
    (d) simultaneously performing ageing, further surface modification, and solvent substitution on the micron-size spherical silica hydrogels by allowing the micron-size spherical silica hydrogels produced in (c) to settle, wherein the solvent substitution is to extract water containing sodium ions from the micron-size spherical silica hydrogels;
    (e) removing the water containing sodium ions extracted from the micron-size spherical silica hydrogels for obtaining a hydrophobic micron-size spherical silica gel; and
    (f) drying the hydrophobic micron-size spherical silica gel produced in (e) to thereby produce the micron-size silica aerogels containing spherical particles.

2. The method of claim 1, wherein the non-polar organic solvent is dispersedly mixed with the surface-modified silica sol at a selected stirring rate and subsequently adding with the second organosilane compound while stirring to produce the micron-size spherical silica hydrogels.

3. The method of claim 1, wherein an average particle size of the micron-size silica aerogels produced is inversely related to the selected stirring rate.

4. The method of claim 1, wherein the water glass solution contains sodium ions before forming the micron-size spherical silica hydrogels.

5. The method of claim 1, wherein the water glass solution has a silica concentration between 3-15 wt %.

6. The method of claim 1, wherein the water glass solution has a silica concentration between 5-8 wt %.

7. The method of claim 1, wherein the inorganic acid comprises sulfuric acid, nitric acid, hydrochloric acid, or a combination of two or more thereof.

8. The method of claim 1, wherein the first organosilane compound comprises hexamethyldisilazane, trimethylchlorosilane, or a combination thereof.

9. The method of claim 1, wherein the second organosilane compound comprises hexamethyldisilazane, hexamethyldisiloxane, trimethylchlorosilane, or a combination of two or more thereof.

10. The method of claim 1, wherein the volume fraction of the first organosilane compound to the aqueous acid-silica sol is less than 6%.

11. The method of claim 1, wherein the volume fraction of the second organosilane compound to the surface-modified silica sol is greater than 4%.

12. The method of claim 1, wherein the water glass solution contains a catalyst or opacifier comprising iron, nickel, platinum, rhenium, silver, vanadium oxide, titanium dioxide, carbon black, or a combination of two or more thereof.

13. The method of claim 1, wherein the non-polar organic solvent comprises pentane, hexane, cyclohexane, methylcyclohexane, heptane, toluene, xylene, or a combination of two or more thereof.

14. The method of claim 1, wherein the ageing, surface modification, and solvent substitution performed on the micron-size spherical silica hydrogels occurs in a temperature range of 25-80° C.

15. The method of claim 1, wherein at least a portion of the drying is performed at ambient pressure or less than the ambient pressure.

16. A micron-size spherical silica aerogel produced from the method of claim 1, wherein an average outer surface pore size is 5-25 times smaller than an average interior pore size of the micron-size spherical silica aerogels.

17. A method for producing a hydrophobic micron-size silica gel containing non-spherical silica particles having a selectable or controllable average particle size, the method comprising:
  (a) providing an aqueous acid-silica sol comprising an inorganic acid and a water glass solution, with a pH less than 3;
  (b) producing a surface-modified silica sol by adding a first organosilane compound to the aqueous acid-silica sol, without gelation of the aqueous acid-silica sol;
  (c) dispersive mixing a non-polar organic solvent in the surface-modified silica sol at a selected stirring rate, without adding a surfactant or dispersant, and subsequently adding a second organosilane compound while stirring to produce micron-size spherical silica hydrogels;
  (d) simultaneously performing ageing, further surface modification, and solvent substitution on the micron-size spherical silica hydrogels by allowing the micron-size spherical silica hydrogels produced in (c) to settle, wherein the solvent substitution is to extract water containing sodium ions from the micron-size spherical silica hydrogels;
  (e) removing the water containing sodium ions extracted from the micron-size spherical silica hydrogels for obtaining a hydrophobic micron-size spherical silica gel; and
  (f) producing the hydrophobic micron-size silica gel containing non-spherical silica particles by stirring the hydrophobic micron-size spherical silica gel.

18. The method of claim 17, further comprising drying the hydrophobic micron-size silica gel containing non-spherical silica particles produced in (f) to thereby produce a hydrophobic silica aerogel powder.

19. The method of claim 17, further comprising coating the hydrophobic micron-size silica gel containing non-spherical silica particles to a porous material to form an organic absorbent material.

20. The method of claim 18, wherein at least a portion of the drying is performed at ambient pressure or less than the ambient pressure.

* * * * *